United States Patent [19]
Ardent

[11] Patent Number: 6,113,258
[45] Date of Patent: Sep. 5, 2000

[54] BATTERY POWERED FOOD STIRRER WITH PIVOTALLY MOUNTED SPRING BIASED ARMS

[76] Inventor: John Craig Ardent, 840 Wedgewood Dr., Pittsburg, Calif. 94565

[21] Appl. No.: 09/342,745

[22] Filed: Jun. 29, 1999

[51] Int. Cl.[7] ........................................ B01F 7/20
[52] U.S. Cl. ................ 366/282; 366/284; 366/326.1
[58] Field of Search ................................ 366/242–252, 366/281–284, 312, 326.1; 99/348

[56] References Cited

U.S. PATENT DOCUMENTS

| | | |
|---|---|---|
| 809,031 | 1/1906 | Swallow ................................. 366/283 |
| 2,896,926 | 7/1959 | Chapman . |
| 3,357,685 | 12/1967 | Stephens . |
| 3,697,053 | 10/1972 | Will ........................................ 99/348 |
| 3,783,770 | 1/1974 | Aries ..................................... 366/249 |
| 4,049,243 | 9/1977 | Kramer ................................. 366/248 |
| 4,151,792 | 5/1979 | Nearhood ............................. 366/251 |
| 4,214,514 | 7/1980 | Contino et al. . |
| 4,234,605 | 11/1980 | Takeuchi . |
| 4,267,703 | 5/1981 | Minifie et al. . |
| 4,820,054 | 4/1989 | Wong . |
| 4,856,910 | 8/1989 | Cuschera ............................. 366/251 |
| 4,948,262 | 8/1990 | Tome, Jr. . |
| 4,964,333 | 10/1990 | Bravo . |
| 5,013,158 | 5/1991 | Tarlow ................................. 366/251 |
| 5,152,212 | 10/1992 | Chauveau . |
| 5,201,263 | 4/1993 | Teng ..................................... 99/348 |
| 5,306,083 | 4/1994 | Caldwell et al. . |
| 5,332,310 | 7/1994 | Wells . |
| 5,372,422 | 12/1994 | Dubroy ................................ 366/251 |
| 5,516,208 | 5/1996 | Givant ................................... 99/348 |
| 5,613,425 | 3/1997 | Krznaric ............................. 366/249 |
| 5,711,602 | 1/1998 | Rohring et al. .................... 366/251 |
| 5,816,136 | 10/1998 | Stallings ............................. 366/282 |
| 5,863,121 | 1/1999 | Dunk ................................... 366/284 |

FOREIGN PATENT DOCUMENTS

| | | | |
|---|---|---|---|
| 2356397 | 1/1978 | France | 366/248 |

*Primary Examiner*—Charles E. Cooley
*Attorney, Agent, or Firm*—Richard Esty Peterson

[57] ABSTRACT

A food stirrer having a battery powered drive mechanism to drive a stirrer shaft with an end paddle, the stirrer shaft being axially adjustable in the housing for cooking vessels of different height, the housing including a pair of spring-biased side arms that have distal ends with handles and contact stops for seating the food stirrer on vessels of different diameter, the arms being off-set from a radial to the shaft to improve the grip of the arms on a vessel during operation.

18 Claims, 3 Drawing Sheets

BATTERY POWERED FOOD STIRRER WITH PIVOTALLY MOUNTED SPRING BIASED ARMS

BACKGROUND OF THE INVENTION

This invention relates to a food preparation appliance, and in particular to a portable, battery-operated food stirrer that is adapted to be used on a variety of different sized cooking vessels. The food stirrer is a cordless appliance with a housing containing a rechargeable battery.

The food stirrer of this invention is designed for use in the home, a restaurant, or a commercial cooking establishment for stirring sauces, broths, gravies, confections, and other temperature sensitive food preparations that customarily must be diligently monitored to prevent scorching or excessive thickening. Although the food stirring appliance of this invention may be an item of convenience for use in the home, in a restaurant kitchen or a commercial cooking establishment, the food stirrer can be an economic necessity. In the restaurant kitchen the concurrent preparation of the many different dishes and courses that go into a meal for many different diners creates a scheduling nightmare. The kitchen chef is unable to continually monitor the preparation of sauces and gravies that are being prepared. While an over-thickened sauce or gravy may be salvaged by thinning, if the sauce or gravy has been scorched, the taste is destroyed and the sauce must be discarded. Similarly, in the commercial cooking environment, often large vats or pots are used to prepare larger volumes of ingredients for prepared commercial foods. In such situations, the burning of an ingredient such as a confectionery topping could cause an interruption in the production and serious delay in the scheduling of other steps in the processing.

Prior art stirring devices have been proposed. In Stevens, U.S. Pat. No. 3,357,685 issued Dec. 12, 1967, there is disclosed a battery-operated stirring unit for sauce pans and the like with a configuration of the general type proposed. The stirring unit of Stevens includes a housing containing a motor with a pair of adjustable yokes that seat on the top rim of a sauce pan. The yokes are adjustable in span to permit the stirring unit to be used on different sized pots or pans. The stirring unit includes an elongated adjustable shaft with a cross-bar having a series of depending stirring blades for contacting the bottom of the pan. The cross-bar allows adjustment of the blades for accommodating different diameter pots or pans. Rotation of the housing is prevented by downturned handles on the yokes which engage the handle or handles of the sauce pan or pot, functioning as a stop.

In Wells, U.S. Pat. No. 5,332,310, issued Jul. 26, 1994, a self-supporting house hold stirring appliance is disclosed. This device includes a four-paddle, stirring mechanism that contacts the bottom of the pan and provides the support for the housing containing the drive motor. The unit has an extending handle that projects outside the pan and contacts the handle of the pan to maintain the position of the stirring appliance. To center the stirring appliance in the pan, the size of the paddles must be nearly identical to the size of the sauce pan. Each of the prior art units has certain disadvantages which has apparently inhibited wide spread use.

Although applicant contemplates that the unit described in this application may be provided in a commercial size and a household size, the design is suitable for a great variety of different sized pans and pots. The food stirrer of this invention has depending posts that contact the handle or handles of the vessel on which it is mounted in order to maintain its stationary position relative to its rotating paddle. However, because of the clamping action of the spring-loaded support arms, the appliance can be used on vessels without handles or handles positioned low on the vessel. Additionally, the support mechanism for mounting the food stirrer on a vessel is designed to provide self-centering, and to increase its grip as the sauce or other condiment thickens and paddle resistance increases. Furthermore, the specially designed paddle blades are useable on a range of different diameter pots and pans.

SUMMARY OF THE INVENTION

The food preparation appliance of this invention comprises a battery-operated, food stirrer that is adapted to be utilized with a variety of different sized pots and pans. The invented appliance includes a housing having a motor with a power source and drive train to engage an elongated shaft having at its distal end a removable paddle. The paddle has two blades designed to contact the bottom and outside edges of the pot or pan on which the unit is seated. The shaft is axially displaceable in the housing allowing the unit to accommodate pots or pans of different depth. The housing includes a pair of pivotally connected support arms having end handles with depending engagement pegs for seating the appliance on the top rim of the pot or pan utilized. The shaft carrying the stirring blades depends from the center of the housing and contacts the bottom of the vessel. The paddle blades may be either of an expanding or contracting type to adjust to the diameter of the vessel in which the unit is utilized.

The unique design of the support arms with a spring-loaded connection to the body of the housing enables the unit to grip the top rim of the vessel and maintain the paddle shaft in a centralized position. As the blades of the paddle encounter resistance, the torque is applied to the housing and transmitted to the arms which, because of their offset position, lock onto the outer rim of the vessel. In this manner, the arrangement of the support arms aid in maintaining the housing body in its stationary position while the paddle rotates. While the arms include depending posts to prevent pivot of the housing by contact with the handles or handle of the vessel the unit is useable on vessels without handles or on vessels where the handles a mounted low on the pot or pan.

To eliminate the use of a power cord, the food stirrer is battery powered and includes a compact battery that drives the drive motor operably connected to the drive train. The DC drive motor and reduction gears of the train are designed to rotate the paddle at approximately 4 revolutions per minute, providing a slow stirring action. Additionally, the blades of the paddle are preferably designed to scoop the food composition from the outer portion of the vessel and fold the food over into the inner portion. In this manner a constant slow mixing as well as stirring occurs. The unique design of the support arms of the housing and the stirring blades of the paddle enables the food stirrer appliance to be utilized on vessels that are from nine inches to sixteen inches in diameter. As noted, a larger commercial unit is scaled to accommodate vessels of correspondingly larger size. These and other features will become apparent from a detailed description of the preferred embodiments that follow.

DETAILED DESCRIPTION OF THE PREFERRED EMBODIMENTS

Figure 1:
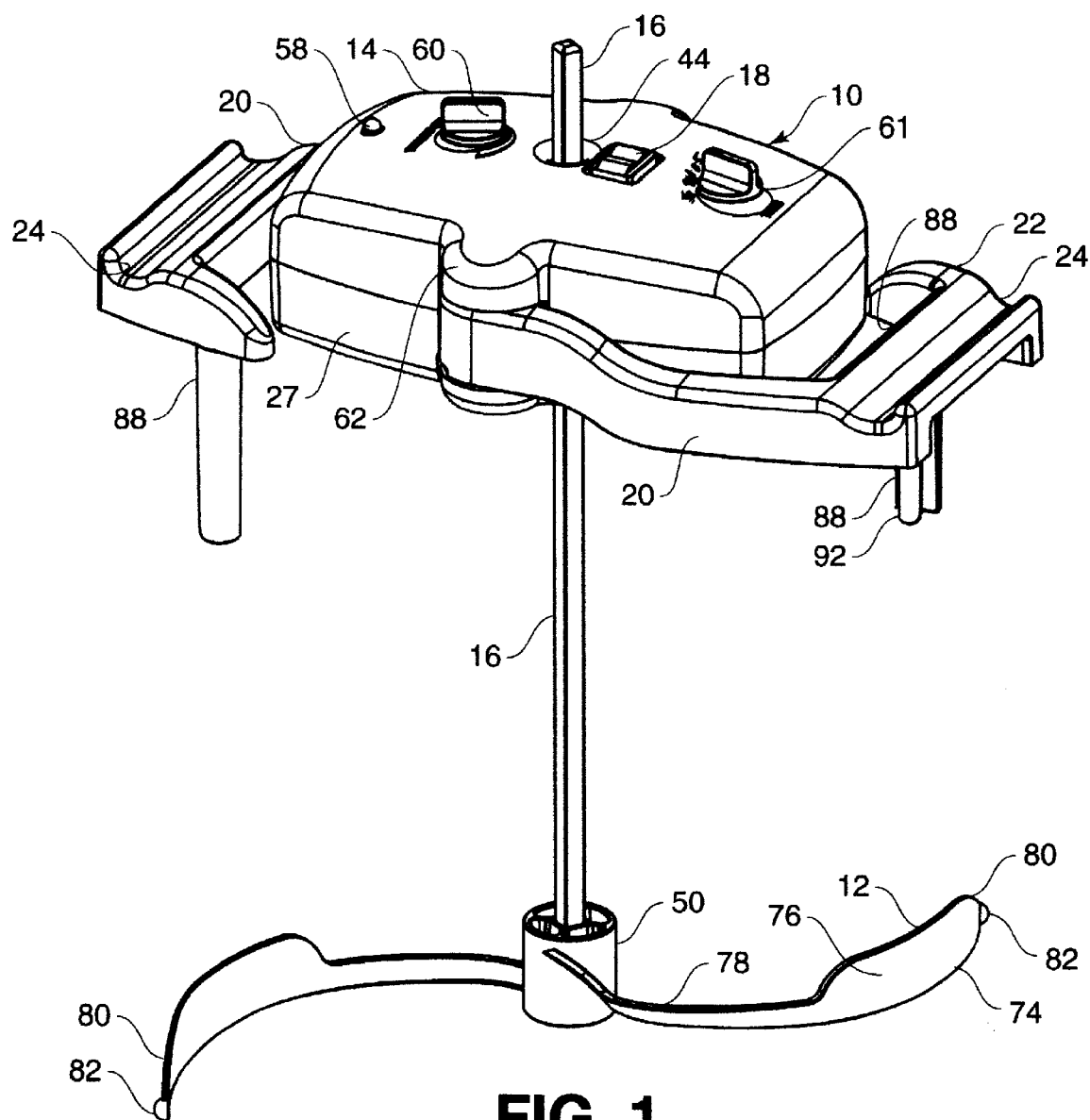
FIG. 1 is a perspective view of the food stirrer of this invention.
Figure 2:
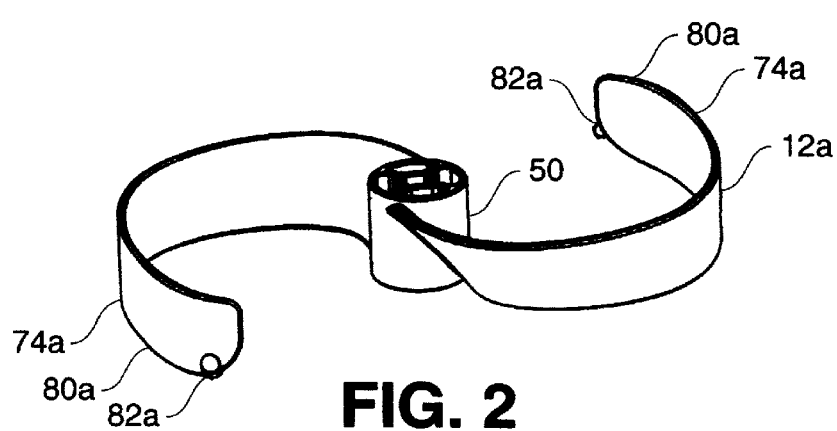
FIG. 2 is an alternate stirrer paddle for the food stirrer of FIG. 1.

The food preparation appliance of this invention comprises a food stirrer and is shown in the drawings and designated generally by the reference numeral 10. The food stirrer comprises a battery-operated, portable device, that is adapted for a variety of different sizes of pans and pots. The device has been primarily designed to slowly stir sauces, gravies, confectioneries and other food compositions that are easily scorched and ordinarily would require constant monitoring. The food stirrer appliance 10 is used on both sauce pans and cooking pots which together with other such cooking containers are designated as cooking vessels in this specification. The food stirrer appliance 10 has one or more replaceable stirring paddles of which two types are shown in FIGS. 1 and 2. The preferred paddle is shown in FIG. 1 and an alternate paddle is shown in FIG. 2. by the reference numerals 12 and 12a, respectively.

Figure 4:
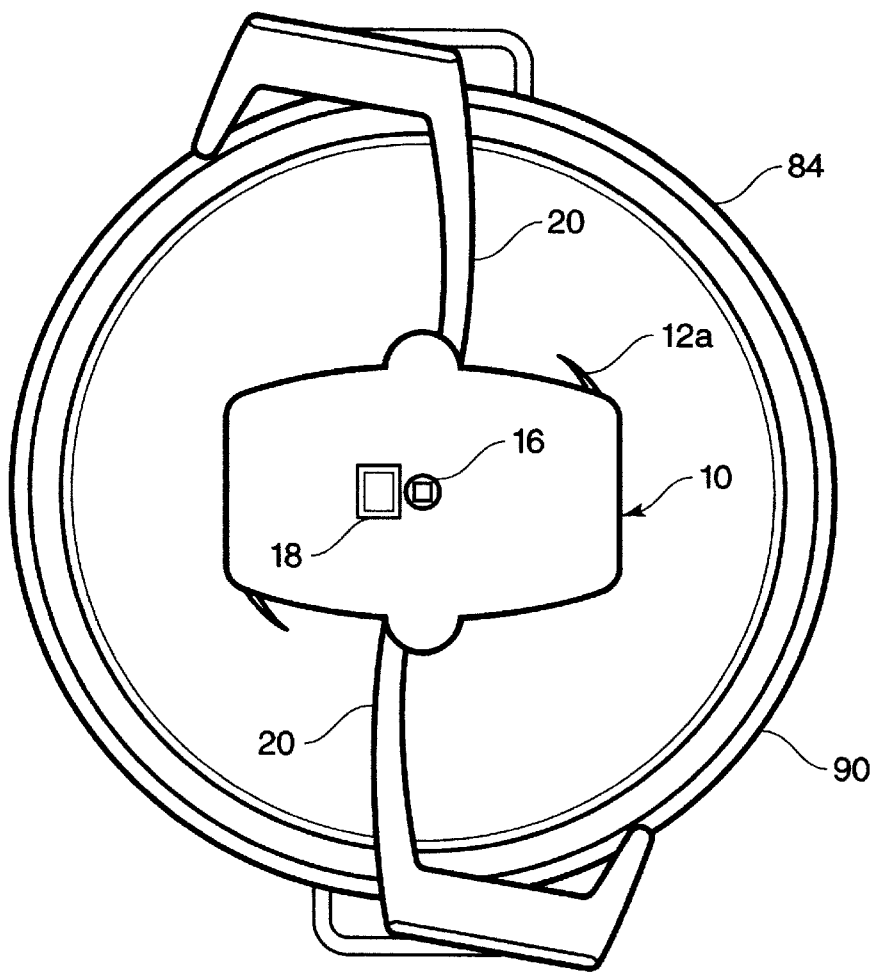
FIG. 4 is a top view of the food stirrer of FIG. 1 with the stirrer paddle of FIG. 2 on a large cooking vessel.
Figure 5:
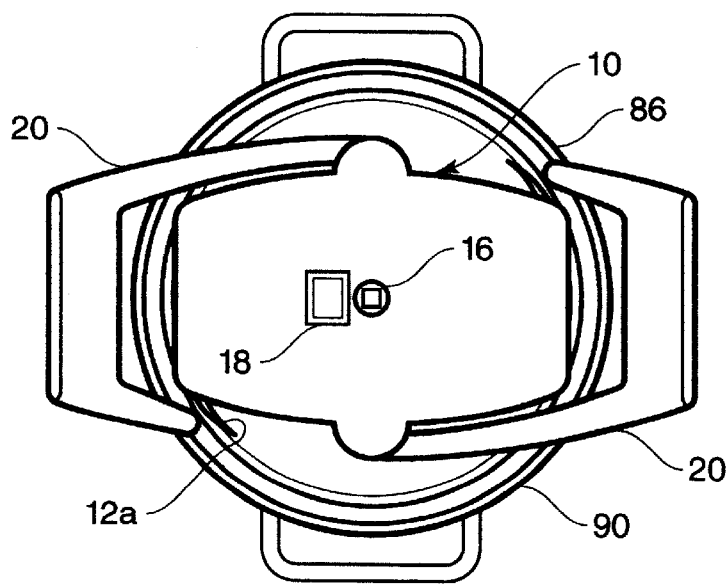
FIG. 5 is a top view of the food stirrer of FIG. 1 with the stirrer paddle of FIG. 2 on a small cooking vessel.

Referring to FIG. 1, the food stirrer 10 includes a housing 14 that contains the drive mechanism for the elongated shaft 16 that is connected at its distal end to the stirring paddle 12. Operation of the stirring paddle 12 is activated by a on-off switch 18 mounted in the top of the housing 14. An alternate type of stirring paddle is shown in FIG. 2, and designated by the reference numeral 12a. The housing 14 includes two pivotally connected support arms 20 and 22 which are each equipped with an integral handle 24 for lifting the appliance and seating the food stirrer onto the top of a cooking vessel, as shown in FIGS. 4 and 5.

Figure 3:
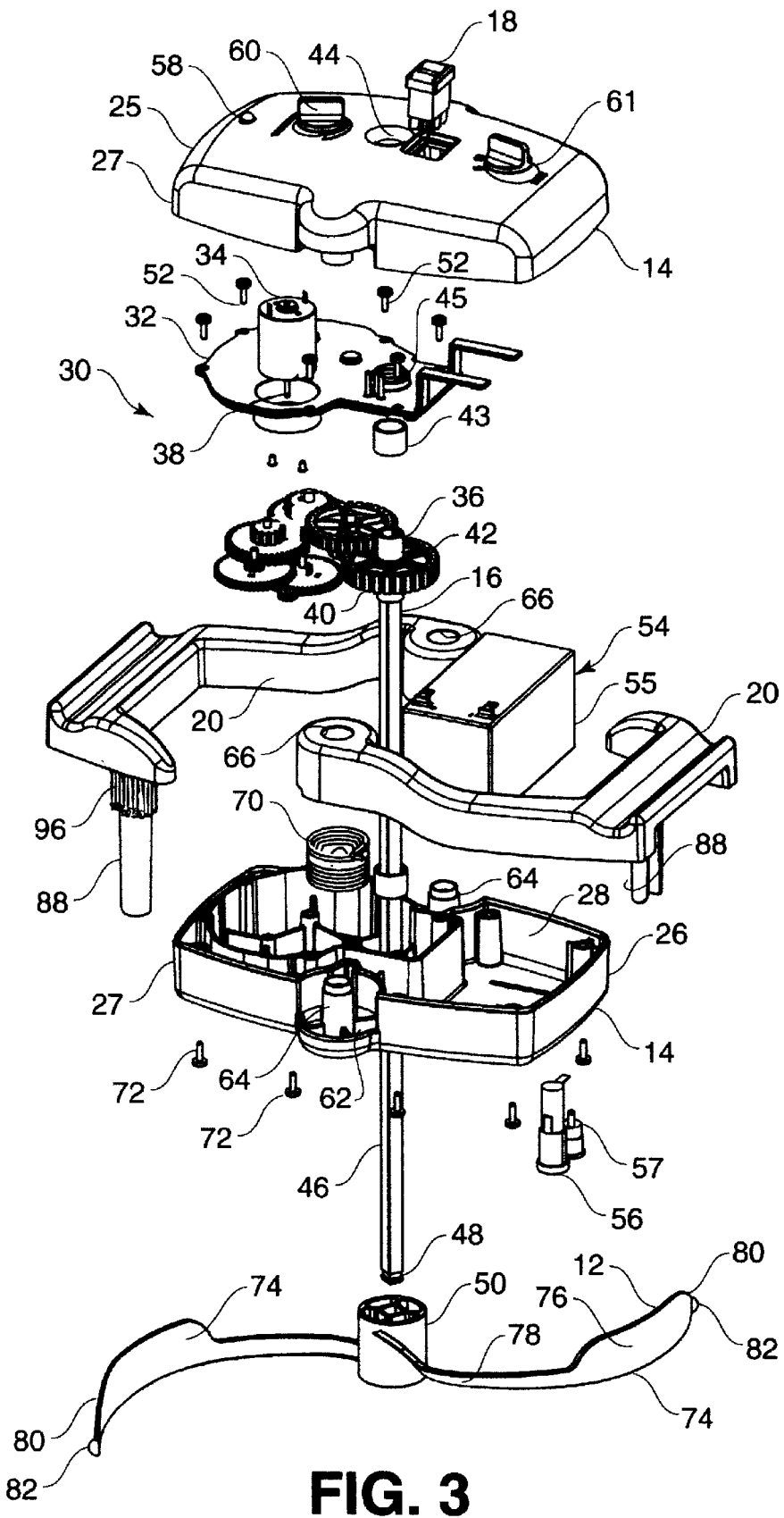
FIG. 3 is an exploded view of the food stirrer of FIG. 1.

Referring to the exploded view of FIG. 3, the housing 14 has a top portion 25 and a bottom portion 26 which when coupled forms a body 27 with a main cavity 28 for containing the drive mechanism 30. The drive mechanism 30 is in part seated on a support plate 32 and includes a drive motor 34 and a gear train 36. The gear train 36 provides a rotation reduction from the drive shaft 38 of the motor to the square stirrer shaft 16. The stirrer gear 40 that engages the shaft 16 includes a sleeve 42 rotably seated in a bearing sleeve 43 that in turn is seated in a bearing mount 45 on the support plate 32. The shaft 16 is slidably engaged in the sleeve 43 of the stirrer gear 40 allowing adjustment of the effective length of the shaft from the housing to the stirring blade 12. The shaft 16 extends through a hole 44 in the top portion of 25 of the housing 14 as shown in FIG. 1. The distal end 46 of the shaft 16 includes a nock 48 that frictionally engages an internal bead (not shown) in the hub 50 of the paddle 12. A similar arrangement is utilized for the alternate type of paddle 12a as shown in FIG. 2. The drive mechanism 30 is assembled and the support plate 32 is secured into the cavity 28 by screws 52.

Powering the drive motor 34 is a power source 54 which in the preferred embodiment comprises a 12 volt, rechargeable battery 55. The battery 55 seats in the cavity 28 and is electrically connected to the drive motor 34. The power source 54 has a conventional electric circuit (not shown) that includes a fuse unit 56 and charge jack 57 that are installed into the bottom portion 26 of the housing 14. As an auxiliary item, the appliance includes a low-battery warning light 58 to signal that the battery is low and needs recharging, and an adjustment knob 60 for varying the speed of the motor within a limited range using a simple potentiometer. The gear train 36 is selected to reduce the revolutions of the motor 34 to an output of approximately 4 revolutions per minute for the stirring paddle 12 or 12a. The speed can be adjusted within a range, for example, from 2–8 revolutions per minute by the adjustment knob 60. A conventional mechanical timer 61 mounted in the housing can signal a set time has past.

The housing 14 also includes a pair of side compartments 62 having pivot pins 64 which engage pivot bearings 66 at the end of the support arms 20. In order to bias the support arms 20 in the contracted minimal position as shown in FIG. 1 and FIG. 5, a coil spring 70 is contained within the side compartment 62 with one end of the spring 70 engaging the housing and the other end engaging the pivot end of the support arm 20. The pivot 66 is trapped within the side compartments 62 when the top portion 24 and bottom portion 26 are assembled and secured with screws 72.

The stirring paddles 12 and 12a are designed with flexible blades 74 and 74a. The paddle 12 shown in FIG. 1 and 2 has elongated, curved blades 74 which are designed to be bowed inwardly to conform to a pot or pan with a diameter less than the span of the unconfined paddle 12.

Conversely, the curved blades 74a of the alternate paddle 12a are initially contracted and expand by flexing as the blades 74a contact and displace the food composition in the bottom of the vessel.

As shown, the paddles 12 and 12a may have different blade configurations. The blades 74 of paddle 12 have a wide end portion 76 with a narrower inner portion 78. This provides a stirring action that scoops the food composition from the outer portion of the pan and folds it over into the inner portion, where it moves outwardly until encountering the following blade. At each tip 80 of the blades 74 are beads 82 which function as a bearing against the bottom wall of the vessel.

The blades 74a of the alternate paddle 12a, are substantially of the same width and as noted expand to the diameter of the vessel during operation. Depending on the action desired the width can differ on replacement paddles (not shown). Optionally, the tip 80a may include a bead 82a of the type shown for the paddle 12 of FIG. 1.

Referring to the drawings the food stirrer 10 is designed to seat on a large vessel 84 as shown in FIG. 4 or a small vessel 86 as shown in FIG. 5, or by adjustment of the spring-biased arms 20, any intermediate vessel.

The positioning of the arms, being off-set from a radial from the stirring shaft 16, results in the torque developed at the counter-clockwise blade being directed to the arms in an axially clockwise direction. This action tends to contract the arms and supplements the bias of the coil springs 70 to increase the frictional grip of depending contact posts 88 at the distal ends of the arms 20. The contact posts 88 engage the outer rim 90 of the vessels 84 and 86. Any slippage of the past on the rim is limited when the post contacts the handle or handles of the vessel. An additional peg 92 on the opposite side of the handles 24 from the post 88 provides a stop for small vessels to protect the depending portion 94 of the handles 24 from contact with the vessel. When the vessel has no handle or has handles mounted low on the vessel, the frictional grip of the posts can be improved by use of a rubber-like sleeve 96, as shown in FIG. 3, on the upper portion of each post.

In operation the appropriate paddle is attached to the end of the shaft and the appliance seated on the cooking vessel by expanding the arms using the handles. The shaft is adjusted to seat the paddle on the bottom of the vessel. When the food stirrer is then turned on, any minor off-center positioning is self-corrected as the contact pegs further grip the outer rim by the torsional action of stirring as described. Rotational speed can be adjusted by the control knob with a timing reminder signaled by the mechanical timer. The housing and paddles are fabricated of food-grade plastic with the stirrer shaft fabricated from food-grade stainless steel. The battery is rechargeable using a standard D.C. charger.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A food stirrer for cooking vessels comprising:
    a housing having a body with an internal cavity;
    a drive mechanism in the housing;
    a power source in the housing connected to the drive mechanism;
    a stirrer paddle;
    a paddle shaft connected to the stirrer paddle and connected to the drive mechanism; and
    a pair of spring-biased support arms with first ends pivotally connected to the housing, and second ends having a contact member, wherein the food stirrer is seatable on a cooking vessel having an outside and a top rim wherein the contact member contacts the top rim of the cooking vessel when the food stirrer is seated on the cooking vessel with the contact member biased against the rim at the outside of the vessel.

2. The food stirrer of claim 1 wherein the pair of spring-biased support arms are connected to opposite sides of the body of the housing.

3. The food stirrer of claim 1 wherein the paddle shaft is located substantially centrally on the body of the housing and has an axis that is substantially vertical when the food stirrer is seated on the cooking vessel.

4. The food stirrer of claim 3 wherein the axis of the paddle shaft defines a central axis and the spring-bias support arms each have a pivotal axis at their first end displaced from the central axis.

5. The food stirrer of claim 4 wherein the pair of spring-biased support arms are connected to opposite sides of the body of the housing wherein the pivotal axis of each spring-biased support arm is displaced an equal and opposite distance from the central axis.

6. The food stirrer of claim 5 wherein the spring-biased support arms each have a coil spring with a first end connected to the arm and a second end connected to the housing.

7. The food stirrer of claim 1 wherein the stirrer paddle has a hub with opposed blades.

8. The food stirrer of claim 7 wherein the blades are flexible.

9. The food stirrer of claim 8 wherein the blades each have a tip and the paddle has a diameter from blade tip to blade tip that is adjustable by bowing of the blades.

10. The food stirrer of claim 9 wherein the blades have an outer portion and an inner portion and the width of the outer portion is greater than the inner portion.

11. A food stirrer for cooking vessels having a top rim comprising:
    a housing;
    a stirrer paddle rotatably connected to the housing;
    drive means mounted in the housing for rotating the stirrer paddle;
    support arms connected to the housing having ends;
    means for extending and retracting the ends from and toward the housing;
    bias means connected to the housing and to the support arms for biasing the support arms toward retracting the ends, wherein the ends of the support arms have means for engaging the top rim of the cooking vessel and wherein the means for extending and retracting the ends from and toward the housing comprise pivots wherein the arms are Pivotally connected to the housing.

12. The food stirrer of claim 11 wherein the bias means comprises a spring mechanism.

13. The food stirrer of claim 12 wherein the means for engaging the top rim of the cooking vessel comprise depending posts mounted to the ends of the support arms.

14. The food stirrer of claim 13 wherein the ends of the support arms include handles for lifting the food stirrer.

15. The food stirrer of claim 11 wherein the drive means includes a drive motor and gear train, the stirrer paddle having a paddle shaft with the gear train connected to the paddle shaft, and the drive motor having a power source.

16. The food stirrer of claim 15 wherein the power source comprises a rechargeable battery.

17. The food stirrer of claim 15 wherein the stirrer paddle is separable from the paddle shaft.

18. The food stirrer of claim 17 wherein the paddle shaft is vertically adjustable in the housing.

* * * * *

(12) EX PARTE REEXAMINATION CERTIFICATE (6916th)
United States Patent
Ardent

(10) Number: US 6,113,258 C1
(45) Certificate Issued: Jul. 7, 2009

(54) BATTERY POWERED FOOD STIRRER WITH PIVOTALLY MOUNTED SPRING BIASED ARMS

(75) Inventor: John Craig Ardent, Pittsburg, CA (US)

(73) Assignee: Ardente, Inc., Pittsburg, CA (US)

Reexamination Request:
No. 90/009,117, Apr. 21, 2008

Reexamination Certificate for:
Patent No.: 6,113,258
Issued: Sep. 5, 2000
Appl. No.: 09/342,745
Filed: Jun. 29, 1999

(51) Int. Cl.
*A47J 43/04* (2006.01)
*A47J 43/07* (2006.01)
*A47J 36/16* (2006.01)
*A47J 36/00* (2006.01)

(52) U.S. Cl. .............. 366/282; 366/284; 366/326.1

(58) Field of Classification Search .................. None
See application file for complete search history.

(56) References Cited

U.S. PATENT DOCUMENTS

| 723,977 | A | 3/1903 | Barney |
| 3,011,768 | A | 12/1961 | Clark |
| 4,339,992 | A | 7/1982 | Kurland |
| 5,372,422 | A | 12/1994 | Dubroy |
| 5,516,208 | A | 5/1996 | Givant |
| 6,286,990 | B1 | 9/2001 | DeZuazo Torres |

FOREIGN PATENT DOCUMENTS

ES 1039734 1/1999

*Primary Examiner*—Terrence R Till

(57) ABSTRACT

A food stirrer having a battery powered drive mechanism to drive a stirrer shaft with an end paddle, the stirrer shaft being axially adjustable in the housing for cooking vessels of different height, the housing including a pair of spring-biased side arms that have distal ends with handles and contact stops for seating the food stirrer on vessels of different diameter, the arms being off-set from a radial to the shaft to improve the grip of the arms on a vessel during operation.

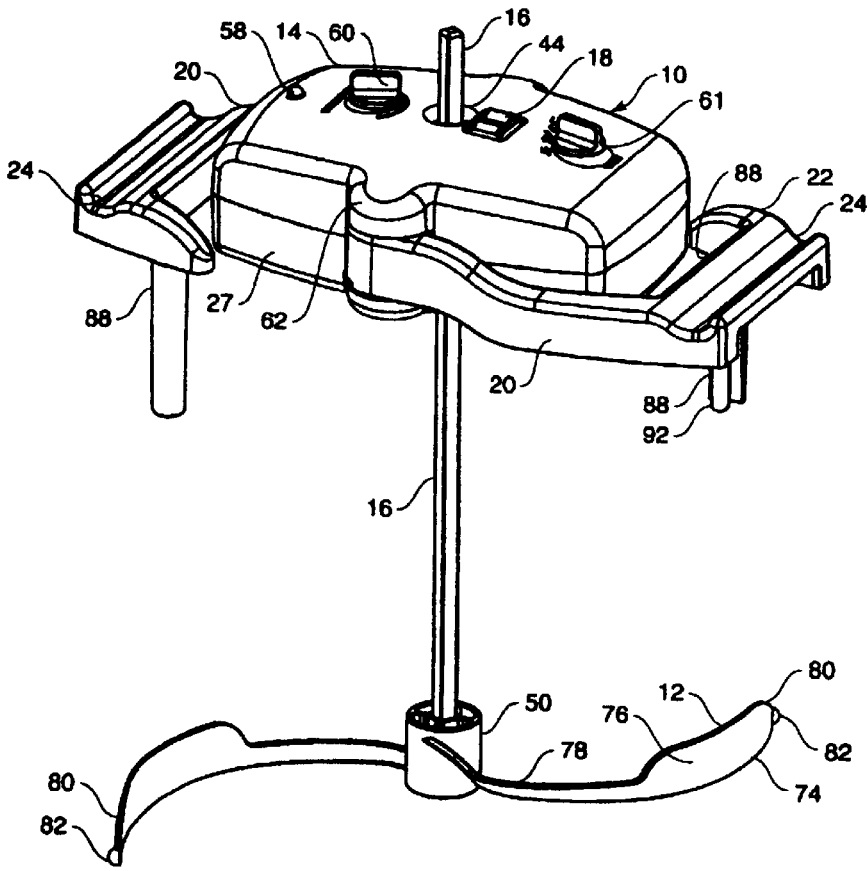

US 6,113,258 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 48–64:

The positioning of the arms, being off-set from a radial from the stirring shaft 16, results in the torque developed at the counter-clockwise blade being directed to the arms in an axially clockwise direction. This action tends to contract the arms and supplements the bias of the coil springs 70 to increase the frictional grip of depending contact posts 88 at the distal ends of the arms 20. The contact posts 88 engage the outer rim 90 of the vessels 84 and 86. Any slippage of the past on the rim is limited when the post contacts the handle or handles of the vessel. An additional peg 92 on the opposite side of the handles 24 from the post 88 provides a stop for small vessels to protect the depending portion 94 of the handles 24 from contact with the vessel. *As shown, the post 88 and peg 92 have different lengths.* When the vessel has no handle or has handles mounted low on the vessel, the functional grip of the posts can be improved by use of a rubber-like sleeve 96, as shown in FIG. 3, on the upper portion of each post.

AS A RESULT OF REEXAMINATION, IT HAS BEEN DETERMINED THAT:

Claims 1, 4, 6, 11, 13 and 14 are determined to be patentable as amended.

Claims 2, 3, 5, 7–10, 12 and 15–18, dependent on an amended claim, are determined to be patentable.

New claims 19–41 are added and determined to be patentable.

1. A food stirrer for cooking vessels comprising:
a housing having a body with an internal cavity;
a drive mechanism in the housing;
a power source in the housing connected to the drive mechanism;
a stirrer paddle;
a paddle shaft connected to the stirrer paddle and connected to the drive mechanism; [and]
a pair of spring-biased support arms with first *and second* ends, *the first ends each* pivotally connected to the housing *for pivotal movement of each support arm about a pivotal axis*, [and] *the* second ends *each* having a contact [member.] *member;*
*the spring-biased support arms each having a spring element connecting the first end of the arm to the housing so to bias the second ends of the support arms for pivotal movement about the pivotal axes toward the housing; and*
wherein the food stirrer is seatable on a cooking vessel having an outside and a top rim wherein the contact member contacts the top rim of the cooking vessel when the food stirrer is seated on the cooking vessel with the contact member biased against the rim at the outside of the vessel.

4. The food stirrer of claim 3 wherein the axis of the paddle shaft defines a central axis and the *pivotal axis of each* spring-bias support [arms each have a pivotal axis at their first end] *arm is* displaced from the central axis.

6. The food stirrer of claim 5 wherein the *spring element of each* spring-biased support [arms each have] *arm is* a coil spring with a first end connected to the *first end of the* arm and a second end connected to the housing.

11. A food stirrer for cooking vessels having a top rim comprising:
a housing;
a stirrer paddle rotatably connected to the housing;
drive means mounted in the housing for rotating the stirrer paddle;
support arms connected to the housing having *first and second* ends;
means for extending and retracting the *second* ends from and toward the housing;
bias means connected to the housing and to the *first ends of the* support arms for biasing the support arms toward retracting the *second* ends, wherein the *second* ends of the support arms have means for engaging the top rim of the cooking vessel and wherein the means for extending and retracting the *second* ends from and toward the housing comprise pivots wherein the arms are [Pivotally] *pivotally* connected to the housing *at the first ends*.

13. The food stirrer of claim 12 wherein the means for engaging the top rim of the cooking vessel comprise depending posts mounted to the *second* ends of the support arms.

14. [The food stirrer of claim 13] *A food stirrer for cooking vessels having a top rim comprising:*
*a housing;*
*a stirrer paddle rotatably connected to the housing;*
*drive means mounted in the housing for rotating the stirrer paddle;*
*support arms connected to the housing having ends;*
*means for extending and retracting the ends from and toward the housing;*
*bias means connected to the housing and to the support arms for biasing the support arms toward retracting the ends, wherein the ends of the support arms have means for engaging the top rim of the cooking vessel and wherein the means for extending and retracting the ends from and toward the housing comprise pivots wherein the arms are pivotally connected to the housing, wherein the means for engaging the top rim of the cooking vessel comprise depending posts mounted to the ends of the support arms,* wherein the ends of the support arms include handles for lifting the food stirrer.

*19. The food stirrer of claim 11, wherein the support arms consists of a pair of the support arms.*

*20. The food stirrer of claim 11, wherein the means for engaging the top rim of the cooking vessel comprise first and second depending posts mounted to the second ends of each of the support arms.*

*21. The food stirrer of claim 20, wherein the first and second depending posts have different lengths.*

*22. The food stirrer of claim 11, wherein the stirrer paddle has opposed blades, each blade having a bearing element for engaging a bottom wall of the cooking vessel.*

23. The food stirrer of claim 11, wherein the means for engaging the top rim of the cooking vessel comprise depending posts mounted to the second ends of the support arms, the depending posts incuding a frictional grip improving portion for engaging an outside of the cooking vessel.

24. The food stirrer of claim 1, wherein support arms of the food stirrer consists of the pair of spring-biased support arms.

25. The food stirrer of claim 1, wherein the second ends of the support arms include handles for lifting the food stirrer.

26. The food stirrer of claim 1, wherein the second ends of the support arms each include an additional contact member positioned between the contact member and the first end.

27. The food stirrer of claim 26, wherein the contact member and the additional contact member have different lengths.

28. The food stirrer of claim 1, wherein the stirrer paddle has opposed blades, each blade having a bearing element contacting a bottom wall of the cooking vessel when the food stirrer is seated on the cooking vessel.

29. The food stirrer of claim 1, wherein the contact members of the second ends include a frictional grip improving portion contacting the outside of the cooking vessel when the food stirrer is seated on the cooking vessel.

30. The food stirrer of claim 1, wherein the stirrer paddle has opposed curved blades, each of the blades having an outer portion and an inner portion and the width of the outer portion is greater than the inner portion.

31. A food stirrer for cooking vessels comprising:
a housing having a body with an internal cavity;
a drive mechanism in the housing;
a power source in the housing connected to the drive mechanism;
a stirrer paddle;
a paddle shaft connected to the stirrer paddle and slidably connected to the drive mechanism such that the paddle shaft is translatable relative to the drive mechanism; and
a pair of spring-biased support arms with first ends pivotally connected to the housing, and second ends having a contact member, wherein support arms of the food stirrer consists of the pair of spring-biased support arms;
wherein the food stirrer is seatable on a cooking vessel having an outside and a top rim wherein the contact member contacts the top rim of the cooking vessel when the food stirrer is seated on the cooking vessel with the contact member biased against the rim at the outside of the vessel.

32. The food stirrer of claim 31, wherein the paddle shaft is located substantially centrally on the body of the housing and has an axis that is substantially vertical when the food stirrer is seated on the cooking vessel.

33. The food stirrer of claim 31, wherein the drive mechanism comprises a rotably seated sleeve adapted to slidably engage the paddle shaft.

34. The food stirrer of claim 31, wherein the paddle shaft is slidably engaged through the drive mechanism such that an effective length of the shaft relative to the housing is adjustable.

35. The food stirrer of claim 31, wherein the housing defines a hole for accommodating the paddle shaft passing therethrough.

36. The food stirrer of claim 31, wherein the second ends of the support arms include handles for lifting the food stirrer.

37. A food stirrer for cooking vessels comprising:
a housing having a body with an internal cavity;
a drive mechanism in the housing;
a power source in the housing connected to the drive mechanism;
a stirrer paddle;
a paddle shaft connected to the stirrer paddle and connected to the drive mechanism; and
a pair of spring-biased support arms with first ends pivotally connected to the housing, and second ends each having a first and a second contact member depending therefrom, where the second contact member is positioned between the first contact member and the first end, and the first and second contact members are biased towards the housing; and
wherein the food stirrer is seatable on a cooking vessel having an outside and a top rim wherein at least one of the contact members contacts the top rim of the cooking vessle when the food stirrer is seated on the cooking vessel with the at least one of the contact members biased against the rim at the outside of the vessel.

38. A food stirrer for cooking vessels comprising:
a housing having a body with an internal cavity;
a drive mechanism in the housing;
a power source in the housing connected to the drive mechanism;
a stirrer paddle;
a paddle shaft connected to the stirrer paddle and connected to the drive mechanism; and
a pair of spring-biased support arms with first ends pivotally connected to the housing, and second ends each having a first and a second contact member depending therefrom, where the second contact member is positioned between the first contact member and the first end; and
wherein the food stirrer is seatable on a cooking vessel having an outside and a top rim wherein at least one of the contact members contacts the top rim of the cooking vessel when the food stirrer is seated on the cooking vessel with the at least one of the contact members biased against the rim at the outside of the vessel, wherein the first and second contact members of the second ends of the support arms have different lengths.

39. A food stirrer for cooking vessels comprising:
a housing having a body with an internal cavity;
a drive mechanism in the housing;
a power source in the housing connected to the drive mechanism;
a stirrer paddle;
a paddle shaft connected to the stirrer paddle and connected to the drive mechanism; and
a pair of spring-biased support arms with first ends pivotally connected to the housing, and second ends each having a first and a second contact member depending therefrom, where the second contact member is positioned between the first contact member and the first end; and
wherein the food stirrer is seatable on a cooking vessel having an outside and a top rim wherein at least one of the contact members contacts the top rim of the cooking vessel when the food stirrer is seated on the cooking vessel with the at least one of the contact members biased against the rim at the outside of the vessel, wherein the first contact members of the second ends include a frictional grip improving portion contacting the outside of the cooking vessel when the food stirrer is seated on the cooking vessel.

40. A food stirrer for cooking vessels comprising:

a housing having a body with an internal cavity;

a drive mechanism in the housing;

a power source in the housing connected to the drive mechanism;

a stirrer paddle;

a paddle shaft connected to the stirrer paddle and connected to the drive mechanism; and a pair of spring-biased support arms with first ends pivotally connected to the housing, and second ends each having a first and a second contact member depending therefrom, where the second contact member is positioned between the first contact member and the first end; and wherein the food stirrer is seatable on a cooking vessel having an outside and a top rim wherein at least one of the contact members contacts the top rim of the cooking vessel when the food stirrer is seated on the cooking vessel with the at least one of the contact members biased against the rim at the outside of the vessel, wherein support arms of the food stirrer consists of the pair of spring-biased support arms.

41. The food stirrer of claim 37, wherein the second ends of the support arms include handles for lifting the food stirrer.

* * * * *